United States Patent Office 3,326,981
Patented June 20, 1967

3,326,981
PROCESS FOR THE PREPARATION OF AROMATIC THIOLS
Joseph Levy, Paramus, N.J., and James Psihas, New York, N.Y., assignors to Universal Oil Products Company, Des Plaines, Ill., a corporation of Delaware
No Drawing. Filed Feb. 4, 1964, Ser. No. 342,523
12 Claims. (Cl. 260—609)

This invention relates to the preparation of aromatic thiols and particularly to an improved method of preparing aromatic thiols by reducing an aromatic sulfonyl halide in the presence of an acid and metallic zinc.

Aromatic thiols and especially the benzene thiols thereof find wide utility in the chemical field either as such or as intermediates in the preparation of other valuable compounds. Such uses and applications include lube oil additives, antioxidants, insecticides, resins and resin modifiers and pharmaceuticals. Notwithstanding, the industrial importance of aromatic thiols, they have heretofore been rather difficult to manufacture and the presently known processes for the preparation of aromatic thiols involve serious limitations when utilized in large scale industrial manufacturing operations.

A known standard process for the preparation of aromatic thiols is the reduction of aromatic sulfonyl halides with metallic zinc in the presence of an acid. In this process during the initial or first phase of the reaction, a mixture of the acid, usually sulfuric or hydrochloric, and the desired aromatic sulfonyl halide is maintained at a low temperature of about 0° C. or lower while the zinc is gradually added. The reaction mixture is then kept at the same low temperature until the initial reaction has subsided. Thereafter, in the second phase of the reaction, the reaction mixture is slowly and carefully heated ultimately to reflux and maintained thereat until the reduction to the corresponding aromatic thiol is completed. In conducting this process, the maintenance of the low temperature of about 0° C. during the initial phase of the reaction has been shown to be essential for the obtainment of satisfactory yields.

This well known standard process has serious limitations which make the commercial preparation of aromatic thiols, utilizing this process, extremely difficult. Included within these serious limitations and disadvantages are the difficulties and hazards encountered in the initial phase of the reaction which, as mentioned above, must be conducted at a critical low temperature range in order to insure acceptable product yields. Thus, this initial phase of the reaction, is highly exothermic, and requires expensive cooling and control apparatus to maintain the critical low temperature range of 0° C. or lower. Another disadvantage is the formation of voluminous, gummy, organo-zinc, intermediate products which are difficult to stir and hinder adequate contacting of the zinc with the acid and aromatic sulfonyl halide. A still further limitation is the frequent occurrence of a sudden, violent, highly exothermic reaction accompanied by a copious evolution of hydrogen which renders the process extremely hazardous, especially for commercial utilization.

It has now been discovered that aromatic thiols can be prepared relatively easily and simply in high yields in a process which does not involve the disadvantages inherent in the aforesaid standard method of preparing aromatic thiols.

It is therefore an object of this invention to provide a simple process for the preparation of aromatic thiols. Another object of this invention is to produce aromatic thiols in a readily controllable reaction. A still further object is to prepare aromatic thiols in high yields in a commercially attractive manner of operation. Other objects and advantages of the present invention will appear from the following embodiments and description.

Taken in its broadest aspect, one embodiment of this invention resides in a process for the preparation of an aromatic thiol which comprises adding an aromatic sulfonyl halide and an acid to an aqueous suspension of metallic zinc at a temperature of about 25° C. to about reflux, and recovering from the resultant mixture said aromatic thiol.

A further embodiment of this invention is found in a process for the preparation of an aromatic thiol which comprises gradually adding simultaneously an aromatic sulfonyl halide and an acid to an aqueous suspension of finely divided metallic zinc at a temperature of about 25° C. to about reflux, and recovering from the resultant mixture said aromatic thiol.

A specific embodiment of this invention is found in a process for the preparation of a p-chlorothiophenol which comprises gradually adding simultaneously a p-chlorobenzenesulfonyl chloride and hydrochloric acid to an aqueous suspension of finely divided metallic zinc at a temperature of about 25° C. to about reflux, and recovering from the resultant mixture said p-chlorothiophenol.

As hereinbefore set forth the present invention is concerned with a process for the preparation of aromatic thiols. The process is effected by adding an aromatic sulfonyl halide and an acid to an aqueous suspension of metallic zinc at an elevated temperature within the range of about 25° C. to about reflux. This processing procedure permits the conversion of the aromatic sulfonyl halide to the corresponding thiol to proceed smoothly in high yield without the previously noted disadvantages and hazards of the aforesaid standard process and thereby effects considerable savings in the production of aromatic thiols.

In particular, this processing procedure does not require extensive cooling and control apparatus to prevent the reaction from proceeding at an uncontrollable rate; it permits the use of reasonable industrial temperatures; it does not result in the formation of voluminous quantities of unmanageable, gummy, organo-zinc intermediate products, thus permitting easy stirring of the reaction mixture; and it is free of the hazard of a sudden, violent, exothermic reaction.

Aromatic sulfonyl halides which may be reduced to the corresponding aromatic thiols, in the process of the present invention, include sulfonyl halide derivatives of simple as well as condensed aromatic compounds such as benzene-, naphthalene-, anthracene-sulfonyl halides and the like. These aromatic sulfonyl halides may have more than one sulfonyl halide group per molecule. Of the aromatic sulfonyl halide compounds suitable for use in the present process, the aromatic sulfonyl chlorides are preferred. Other sulfonyl halides such as the sulfonyl bromides and fluorides may also be used, but not necessarily with equivalent results. The aromatic portion of the sulfonyl halides may be substituted in any of the positions not occupied with a sulfonyl halide radical. Such substituents include alkyl, halogen, trifluoromethyl, alkoxy, alkylmercapto, carboxy, aryl, aryloxy, arylmercapto or arylsulfonyl radicals. The process of the present invention may also be applied to the reduction of sulfonyl halide derivatives of aliphatic and heterocyclic compounds to the corresponding thiols.

Examples of a few aromatic thiols which may be prepared from the above recited class of aromatic sulfonyl halides include thiophenol, o-chlorothiophenol, p-chlorothiophenol, 2,4-dichlorothiophenol, o-bromothiophenol, p-fluorothiophenol, 2,4-dibromothiophenol, 2,4,5-trichlorothiophenol, p-methylthiophenol, p-methoxythiophenol, p-trifluoromethylthiophenol, p-methylmercaptothiophenol, p-tertiarybutylthiophenol, 2,4-dimethylthiophenol, dithioresorcinol, p-phenoxythiophenol, p-phenylthiophenol, naphthalene-1,5-dithiol, or anthracene-2-thiol.

In conducting the process, it is essential that the acid and aromatic sulfonyl halide be added to the aqueous suspension of metallic zinc and that the addition be performed at a temperature above about 25° C. The initial temperature, that is the temperature at the start of the addition of the acid and aromatic sulfonyl halide to the aqueous suspension, may be relatively low, at least about 25° C., which may then be maintained or, preferably be permitted to rise, up to about reflux, during the reaction either by allowing the mixture to heat spontaneously or by supplying external heat. It is generally desirable, however, to complete the reaction at an elevated temperature, preferably at reflux. A preferred manner of conducting the process is to have the aqueous suspension at reflux temperature initially during the addition of the reactants and maintained at this temperature throughout the reaction.

The addition of the aromatic sulfonyl halide and acid to the aqueous suspension of metallic zinc is an essential feature of the process and the preferred manner of adding the aromatic sulfonyl halide and acid is to add them simultaneously in separate streams either in a continuous or discontinuous fashion. Other manners or modes of addition may be utilized, but generally not with equivalent results. For example, if all the aromatic sulfonyl halide is added prior to the addition of the acid, lower yields will be obtained due to side reactions. If all of the acid is added prior to the addition of the aromatic sulfonyl halide, considerable losses will be suffered with production of hydrogen through reaction of the acid and zinc.

Optimum yields are generally obtained when the addition is so conducted that sufficient acid is present to permit smooth and ready reduction of the added aromatic sulfonyl halide to the corresponding thiol. The aromatic sulfonyl halide and the acid may be added in a single stream when a mixture of acid and aromatic sulfonyl halide is readily available. This single stream method of addition will generally be desirable when the aromatic sulfonyl halide is prepared just prior to being subsequently reduced in the present invention. For example, benzenesulfonyl chloride may be prepared by reacting benzene with chlorosulfonic acid resulting in a mixture of benzenesulfonyl chloride and hydrochloric and sulfuric acids, which mixture may then be directedly added to the aqueous suspension of zinc in a single stream according to the present invention.

The rate of addition of the acid and aromatic sulfonyl halide to the aqueous suspension generally should be gradual so to as allow the reaction to proceed smoothly. When adding simultaneously in two streams the rate of addition of acid and aromatic sulfonyl halide generally should be proportional, but it may be desirable in certain instances, for better reaction control, to add the acid at a slower rate than the aromatic sulfonyl halide. The time required to complete the addition of the acid and aromatic sulfonyl halide will vary dependent upon such factors as the quantity of reactants and the temperature of the suspension. Generally an addition time of from about one hour to about ten hours will be sufficient for most operations. To facilitate addition of the aromatic sulfonyl halide, it may be desirable to add its dissolved in an inert solvent. Organic solvents are preferable for this purpose and include such compounds as toluene and xylene.

After the addition of the acid and aromatic sulfonyl halide is completed, the resultant mixture is maintained at a temperature of from about 25° C. to about reflux for a time sufficient to complete the reduction to the corresponding aromatic thiol. This period of time is not critical and a period of from about two to about fifteen hours is usually sufficient. The time required to complete the reduction is to a certain extent dependent upon the degree of the contacting of the reactants and for this reason it is desirable to provide adequate stirring to insure adequate mixing of all the reactants.

After the aromatic sulfonyl halide is converted to the corresponding aromatic thiol, the aromatic thiol may be separated from the reaction mixture by any suitable separational method. One method is to recover the organic layer containing the aromatic thiol from unreacted zinc by steam distillation. This is then followed by separation of the organic layer from the water, drying and fractionation to recover the desired aromatic thiol. Another separational method which may be used in the present process is solvent extraction. This method is particularly adaptable to the present process because as hereinabove mentioned there is little production of gummy, insoluble materials. Thus, any unreacted metallic zinc may simply be removed from the reaction mixture by filtration and the remaining mixture contacted with a suitable solvent, such as toluene or xylene, which can then be readily separated and then distilled to recover the product.

The ratio of reactants is not critical in the process, and generally the reactants may be varied with relatively comparable results. While stoichiometric quantities of about one mole of aromatic sulfonyl halide may be reacted with about 5 moles of acid and about 3 moles of zinc, it is generally desirable to employ an excess of acid and particularly an excess of the zinc of up to about 100 percent. The unconsumed zinc, however, is readily recovered for reuse.

The zinc used in the processes is preferably metallic zinc and by metallic zinc is meant zinc metal of zero oxidation state. Included within the term metallic zinc are zinc amalgams, but generally the use of zinc amalgam in place of metallic zinc is not necessary. For optimum results, the metallic zinc should be in a finely divided state such as, for example, the commercial grade of zinc powder. The purity of the metallic zinc used is not critical and the generally available commercial grades of zinc, such as the aforementioned zinc powder are suitable for use in the process.

The quantity of water required to form the suspension is not important and generally it is only necessary that there be sufficient water present to adequately suspend the metallic zinc and to form a freely stirrable mixture. A quantity of water approximately equal in weight to the weight of the metallic zinc will, in most cases, be satisfactory.

The acid which may be utilized in the process includes inorganic and organic acids although use of different acids may not necessarily achieve equivalent results. Examples of suitable inorganic acids are hydrochloric or sulfuric or mixtures thereof and examples of organic acids are acetic or propionic acids. Preferably a strong mineral acid such as the aforementioned hydrochloric or sulfuric is utilized for best results.

The process of this invention is preferably effected in a batch type operation. For example, a quantity of finely divided metallic zinc and water may be charged to a suitable apparatus having stirring means. The resultant suspension is heated to the desired temperature and is stirred while the acid and aromatic sulfonyl halide are gradually added simultaneously from two addition vessels. The reaction mixture is then maintained at the desired temperature for a sufficient time to complete the reaction. After the reaction is completed any unreacted zinc is removed by filtration and the desired aromatic thiol is extracted with a solvent followed by fractionation to recover the substantially pure aromatic thiol.

The following examples are given to illustrate the process of the present invention which, however, are not intended to limit the generally broad scope of the present invention in strict accordance therewith.

Example I

In this example, p-chlorothiophenol was prepared by the following procedure. 184 grams of zinc dust and 144 grams of water were charged with stirring to a reaction flask and then heated to reflux. While the resultant suspension was stirred, there was gradually added simultaneously from two addition funnels 105.6 grams (0.5 mole) of p-chlorobenzenesulfonyl chloride, dissolved in 60 grams of toluene, and 640 grams of concentrated hydrochloric acid (36–37% HCl). The p-chlorobenzenesulfonyl chloride was added at a slightly faster rate than the hydrochloric acid with the addition of the p-chlorobenzenesulfonyl chloride being completed in about two hours and the hydrochloric acid being completed in about 2.5 hours. During the addition, the reaction was slightly exothermic and proceeded smoothly with a relatively slow evolution of hydrogen gas mixed with a minor amount of hydrogen sulfide. The temperature of the reaction mixture was maintained substantially at reflux for an additional 4 hours. The mixture was then cooled to about 25° C. and filtered to remove the unreacted zinc. The remaning mixture was substantially free of any gummy, insoluble materials. The p-chlorothiophenol was extracted from the zinc-free solution by adding 100 cc. of toluene. The resultant oil layer was distilled to give 67.9 grams of p-chlorothiophenol of 99.5% purity boiling sharply at 90°–91° C. at 12 mm. pressure. The yield of p-chlorothiophenol was 94% of theory.

Example II

In this example, p-methylthiophenol was prepared by the following procedure. 184 grams of zinc dust and 144 grams of water were charged with stirring to a reaction flask and then heated to reflux. While the resultant suspension was stirred, there was gradually added simultaneously from two addition funnels 95.3 grams (0.5 mole) of p-methylbenzenesulfonyl chloride, dissolved in 60 grams of toluene, and 640 grams of concentrated hydrochloric acid (36–37% HCl). The p-methylbenzenesulfonyl chloride was added at a slightly faster rate than the hydrochloric acid with the addition of both reactants being completed in about two hours. During the addition, the reaction was slightly exothermic and proceeded smoothly with a slight evolution of hydrogen gas mixed with a minor amount of hydrogen sulfide. The temperature of the mixture was maintained at reflux (about 94° C.) for an additional 3¾ hours and then reduced by cooling to about 25° C. The unreacted zinc was readily separated from the mixture by filtration. To the remaining mixture was added 50 grams of toluene and the resultant toluene layer was separated and then distilled to give 57.7 grams of p-methylthiophenol. The yield of the p-methylthiophenol was 93% of theory.

Example III

In this example, p-methylthiophenol was prepared by the following procedure. 184 grams of zinc dust and 550 grams of water were charged with stirring to a reaction flask and then heated to reflux. While the resultant suspension was stirred, there was gradually added over a period of one hour 95 grams (0.5 mole) of p-methylbenzenesulfonyl chloride dissolved in 60 grams of toluene. After the addition of the sulfonyl chloride, there was slowly added over a period of four hours 640 grams of concentrated hydrochloric acid (36–37% HCl). The temperature of the mixture was maintained at reflux (about 90° C.) for an additional two hours and then reduced by cooling to about 25° C. The unreacted zinc was readily separated from the mixture by filtration. To the remaining mixture was added additional toluene and the resultant toluene layer was separated and then distilled to give 39.5 grams of p-methylthiophenol. The yield of the p-methylthiophenol was 64% of theory.

Example IV

In this example, o-chlorothiophenol was prepared by the following procedure. 160 grams of zinc dust and 125 grams of water were charged with stirring to a reaction flask and then heated to about 35° C. While the resultant suspension was stirred, there was gradually added simultaneously from two addition funnels 141.4 grams of crude o-chlorobenzenesulfonyl chloride, admixed with 135 cc. of toluene, and 558 grams of concentrated hydrochloric acid (36–37% HCl). The crude o-chlorobenzenesulfonyl chloride employed in this reaction had been prepared from 0.5 mole o-chloraniline via diazotization and subsequent reaction with sulfur dioxide and hydrochloric acid and was used for the present reduction without isolation or purification. The addition of both the crude o-chlorobenzenesulfonyl chloride and the hydrochloric acid was completed in about two hours. During the addition, the reaction was slightly exothermic and proceeded smoothly with a slight evolution of hydrogen gas mixed with a minor amount of hydrogen sulfide. The temperature of the reaction mixture was then maintained at about 41–46° C. for one hour; at about 50° C. for ½ hour; and then was gradually raised by external heating to reflux over a period of ½ hour. The reaction mixture was then maintained at reflux (about 96° C.) for an additional 4⅓ hours and then cooled to about 25° C. The unreacted zinc was readily separated from the mixture by filtration. To the remaining solution was added 100 grams of toluene and the resultant toluene layer was then distilled to recover 55.8 grams of o-chlorothiophenol. The yield of the o-chlorothiophenol was 77.2% of theory calculated on the o-chloraniline originally used to prepare the crude o-chlorobenzenesulfonyl chloride. Accordingly, the yield on the reduction step is obviously greater than 77.2%.

Example V

In this example, 2,4,5-trichlorothiophenol is prepared by the following procedure. Zinc dust and water are charged with stirring to a reaction flask and then heated to reflux. While the resultant suspension is stirred, there is gradually added simultaneously from two addition funnels 2,4,5-trichlorobenzenesulfonyl chloride, in toluene solution, and concentrated hydrochloric acid. The addition of both the acid and sulfonyl chloride is completed in about two hours. During the addition, the reaction is slightly exothermic and proceeds smoothly with a slight evolution of hydrogen gas mixed with a minor amount of hydrogen sulfide. The temperature of the reaction mixture is maintained at reflux for an additional 4 hours and then reduced to about 25° C. The unreacted zinc is readily separated from the mixture by filtration. To the remaining mixture is added additional toluene and the resulting toluene layer is separated and the desired 2,4,5-trichlorothiophenol is recovered.

Example VI

In this example, p-methoxythiophenol is prepared by the following procedure. Zinc dust and water are charged with stirring to a reaction flask and then heated to about reflux. While the resultant suspension is stirred, there is gradually added simultaneously from two addition funnels p-methoxybenzenesulfonyl chloride and sulfuric acid. The addition of both the acid and sulfonyl chloride is completed in about two hours. During the addition, the reaction is slightly exothermic and proceeds smoothly with a slight evolution of hydrogen gas mixed with a minor amount of hydrogen sulfide. The temperature of the reaction mixture is maintained at reflux for an additional four hours and then reduced to about 25° C. The unreacted zinc is readily separated from the mixture by filtration. To the remaining mixture is added toluene and the resulting toluene layer is treated to recover the desired p-methoxythiophenol.

Example VII

In this example, 2-thionaphthol is prepared by the following procedure. Zinc dust and water are charged with stirring to a reaction flask and then heated to reflux. While the resultant suspension is stirred, there is gradually added simultaneously from two addition funnels 2-naphthalenesulfonyl chloride, admixed with toluene, and concentrated hydrochloric acid. The addition of both the acid and sulfonyl chloride is completed in about two hours. During the addition, the reaction is slightly exothermic and proceeds smoothly with a slight evolution of hydrogen gas mixed with a minor amount of hydrogen sulfide. The temperature of the reaction mixture is maintained at reflux for about four hours and then reduced to about 25° C. The unreacted zinc is readily separated from the mixture by filtration. To the remaining solution is added additional toluene and the resulting toluene layer is treated to recover the desired 2-thionaphthol.

Example VIII

In this example, dithioresorcinol is prepared by the following procedure. Zinc dust and water are charged with stirring to a reaction flask and then heated to about reflux. While the resultant suspension is stirred, there is gradually added simultaneously from two addition funnels, 1,3-benzenedisulfonyl chloride, admixed with toluene, and concentrated hydrochloric acid. The addition of both the acid and sulfonyl chloride is completed in about two hours. During the addition, the reaction is slightly exothermic and proceeds smoothly with a slight evolution of hydrogen gas. The temperature of the reaction mixture is maintained at reflux for an additional four hours and then reduced to about 25° C. The unreacted zinc is readily separated from the mixture by filtration. To the remaining mixture is added toluene and the resulting toluene layer is separated and the desired dithioresorcinol is recovered.

Example IX

This example is included for purposes of contrasting the process of the present invention with a known standard process for the preparation of thiophenols. In this example, 2120 grams of crushed ice and 706 grams of concentrated sulfuric acid were added to a reaction flask. The flask was immersed in a freezing mixture of ice and salt and maintained at a temperature of −5° to 0° C. throughout the first phase of the preparation. To the acid-water mixture was added, with stirring, 176.5 grams of benzenesulfonyl chloride over a period of one hour. Benzenesulfonyl chloride melts at 14° C. and hence it was necessary to add the benzenesulfonyl chloride very slowly with vigorous stirring in order that it be as finely divided as possible to insure adequate contacting in the subsequent reduction. To the acid-benzenesulfonyl chloride mixture was added 353 grams of zinc dust at a rate such that the temperature did not rise above about 0° C. This took about ½ hour. The reaction was highly exothermic, very difficult to control, and accompanied by evolution of hydrogen gas. Gummy, organo-zinc products formed and the mixture became progressively more difficult to stir. It was absolutely essential that the temperature during the first part or phase of the reaction be kept at about 0° C. or below for otherwise poor yields resulted. After the zinc addition, the resultant mixture was stirred at about 0° C. for about one hour at which time the ice-salt bath was removed and the reaction mixture was allowed to warm up spontaneously. At about 15° C. to 20° C., a rather violent reaction occurred with a voluminous evolution of hydrogen gas. At this point it was necessary to again cool the reaction flask. After the violent reaction subsided, the reaction mixture was carefully heated to about 30° to 35° C. and maintained for about one hour. It was then gradually heated to reflux, as rapidly as copious evolution of hydrogen gas permitted, and maintained thereat until the organo-zinc products completely reacted. This required about 12 hours. The reaction mixture was extracted with benzene to separate the thiophenol and after evaporation of the benzene, there remained 104 grams of crude thiophenol.

We claim as our invention:

1. In the preparation of an aromatic thiol by the reduction of an aromatic sulfonyl chloride with metallic zinc in the presence of a mineral acid, the improvement which comprises gradually and simultaneously adding said chloride and acid to an aqueous suspension of metallic zinc while maintaining the suspension at reflux temperature.

2. The improvement of claim 1 further characterized in that said sulfonyl chloride is added in an inert solvent.

3. The improvement of claim 1 further characterized in that said acid is hydrochloric acid.

4. The improvement of claim 1 further characterized in that said acid is sulfuric acid.

5. Process for the preparation of a thiophenol which comprises gradually adding simultaneously a benzenesulfonyl chloride and a mineral acid to an aqueous suspension of finely divided metallic zinc maintained at reflux temperature, and recovering from the resultant mixture said thiophenol.

6. Process for the preparation of a p-chlorothiophenol which comprises gradually adding simultaneously a p-chlorobenzenesulfonyl chloride and hydrochloric acid to an aqueous suspension of finely divided metallic zinc maintained at reflux temperature, and recovering from the resultant mixture said p-chlorothiophenol.

7. Process for the preparation of an o-chlorothiophenol which comprises gradually adding simultaneously an o-chlorobenzenesulfonyl chloride and hydrochloric acid to an aqueous suspension of finely divided metallic zinc maintained at reflux temperature, and recovering from the resultant mixture said o-chlorothiophenol.

8. Process for the preparation of a p-methylthiophenol which comprises gradually adding simultaneously a p-methylbenzenesulfonyl chloride and hydrochloric acid to an aqueous suspension of finely divided metallic zinc maintained at reflux temperature, and recovering from the resultant mixture said p-methylthiophenol.

9. Process for the preparation of 2,4,5-trichlorothiophenol which comprises gradually adding simultaneously 2,4,5-trichlorobenzenesulfonyl chloride and hydrochloric acid to an aqueous suspension of finely divided metallic zinc maintained at reflux temperature, and recovering from the resultant mixture said 2,4,5-trichlorothiophenol.

10. Process for the preparation of a p-methoxythiophenol which comprises gradually adding simultaneously a p-methoxybenzenesulfonyl chloride and hydrochloric acid to an aqueous suspension of finely divided metallic zinc maintained at reflux temperature, and recovering from the resultant mixture said p-methoxythiophenol.

11. Process for the preparation of a thionaphthol which comprises gradually adding simultaneously a naphthalenesulfonyl chloride and a mineral acid to an aqueous suspension of finely divided metallic zinc maintained at reflux temperature, and recovering from the resultant mixture said thionaphthol.

12. Process for the preparation of a 2-thionaphthol which comprises gradually adding simultaneously a 2-naphthalenesulfonyl chloride and a mineral acid to an aqueous suspension of finely divided metallic zinc maintained at reflux temperature, and recovering from the resultant mixture said thionaphthol.

References Cited

UNITED STATES PATENTS

| | | | |
|---|---|---|---|
| 2,216,849 | 10/1940 | Lubs et al. | 260—609 |
| 2,792,422 | 5/1957 | Harris et al. | 260—609 |

CHARLES B. PARKER, *Primary Examiner.*

DELBERT R. PHILLIPS, *Assistant Examiner.*